United States Patent [19]

Hiyama

[11] Patent Number: 5,421,018
[45] Date of Patent: May 30, 1995

[54] DATA COMMUNICATION METHOD AND APPARATUS HAVING IMPROVED CONTROL OVER A DETACHABLE TERMINAL DEVICE

[75] Inventor: Yutaka Hiyama, Yokohama, Japan

[73] Assignee: Canon Kabushiki Kaisha, Tokyo, Japan

[21] Appl. No.: 972,737

[22] Filed: Nov. 6, 1992

Related U.S. Application Data

[63] Continuation of Ser. No. 372,906, Jun. 29, 1989, abandoned.

[30] Foreign Application Priority Data

Jul. 11, 1988 [JP] Japan .................................. 63-170859

[51] Int. Cl.$^6$ ...................... G06F 1/18; G06F 13/00
[52] U.S. Cl. ................................ 395/800; 395/200; 395/325; 395/750; 364/DIG. 1
[58] Field of Search ................. 395/200, 750, 325, 800

[56] References Cited

U.S. PATENT DOCUMENTS

| | | | |
|---|---|---|---|
| 3,956,740 | 5/1976 | Jones et al. | 340/172.5 |
| 4,251,153 | 2/1981 | Levine | 355/3 R |
| 4,438,459 | 3/1984 | Levine | 358/258 |
| 4,482,980 | 11/1984 | Korowitz et al. | 364/900 |
| 4,558,220 | 12/1985 | Liantaud et al. | 320/2 |
| 4,584,719 | 4/1986 | Miller | 364/200 |
| 4,588,282 | 5/1986 | Levine | 355/3 R |
| 4,611,291 | 9/1986 | Hoelscher | 364/550 |
| 4,625,276 | 11/1986 | Benton et al. | 364/408 |
| 4,630,233 | 12/1986 | Weppler | 364/900 |
| 4,656,318 | 4/1987 | Noyes | 379/93 |
| 4,667,289 | 5/1987 | Yoshida et al. | 364/200 |
| 4,750,136 | 6/1988 | Arpin et al. | 364/200 |
| 4,783,598 | 11/1988 | McAdams, Jr. | 250/566 |
| 4,835,737 | 5/1989 | Herrig et al. | 364/900 |
| 4,852,041 | 7/1989 | Nakano | 364/900 |
| 4,870,643 | 9/1989 | Bultman et al. | 371/11.1 |
| 4,922,448 | 5/1990 | Kunieda et al. | 364/900 |
| 4,937,806 | 6/1990 | Babson et al. | 364/708 |
| 4,951,309 | 8/1990 | Gross et al. | 379/93 |
| 4,999,787 | 3/1991 | McNally et al. | 364/900 |
| 5,129,091 | 7/1992 | Yorimoto et al. | 395/750 |

*Primary Examiner*—Robert B. Harrell
*Assistant Examiner*—William M. Treat
*Attorney, Agent, or Firm*—Fitzpatrick, Cella, Harper & Scinto

[57] ABSTRACT

In a data communication system between a host apparatus and a portable terminal, there is provided an electronic apparatus for intermediation which is connected to the host apparatus and which can be removably connected to the portable terminal. Power is supplied to the electronic apparatus for intermediation only when the portable terminal is connected. When the portable terminal is connected to the electronic apparatus for intermediation, transmission and reception of data are started between the portable terminal and the host apparatus.

3 Claims, 3 Drawing Sheets

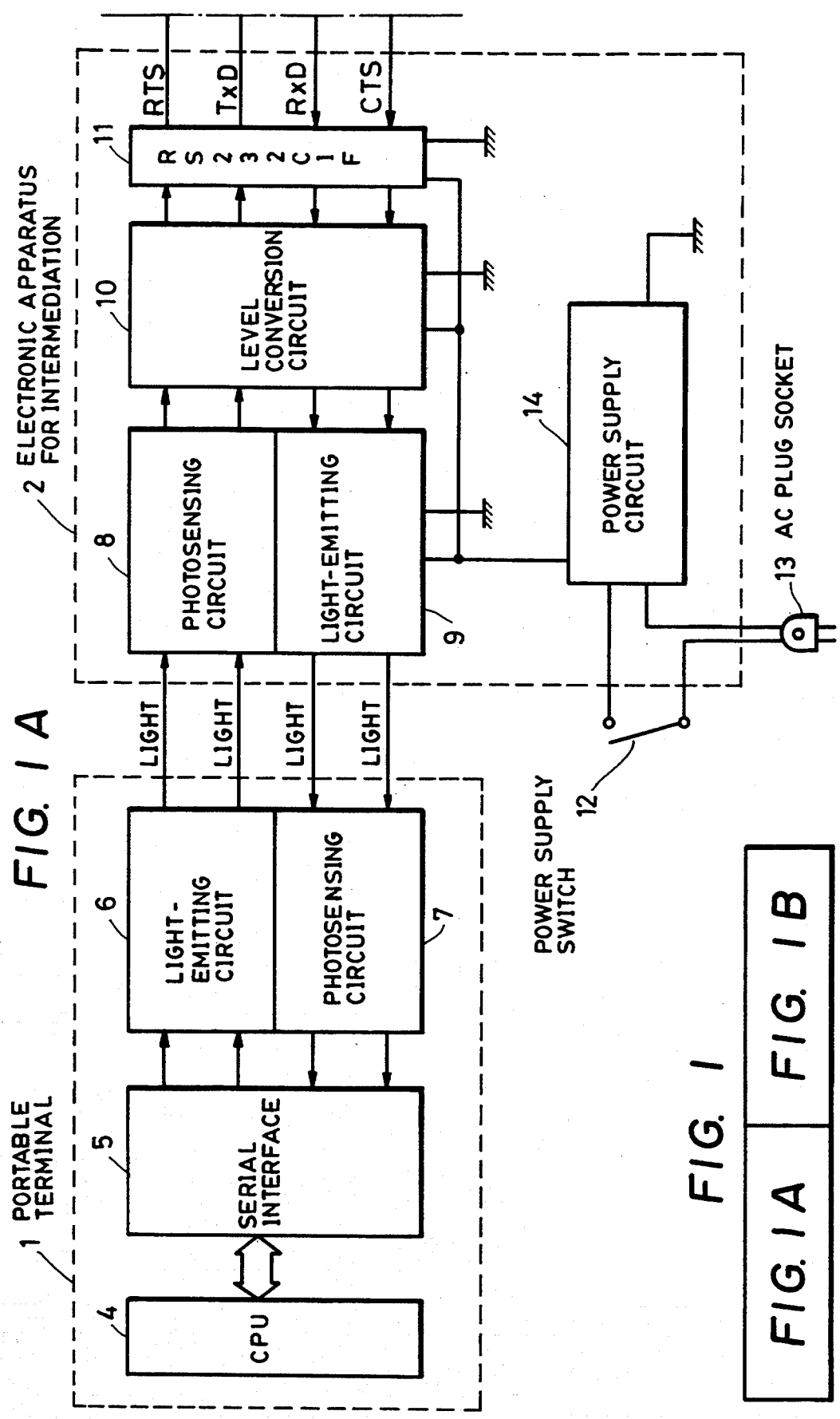

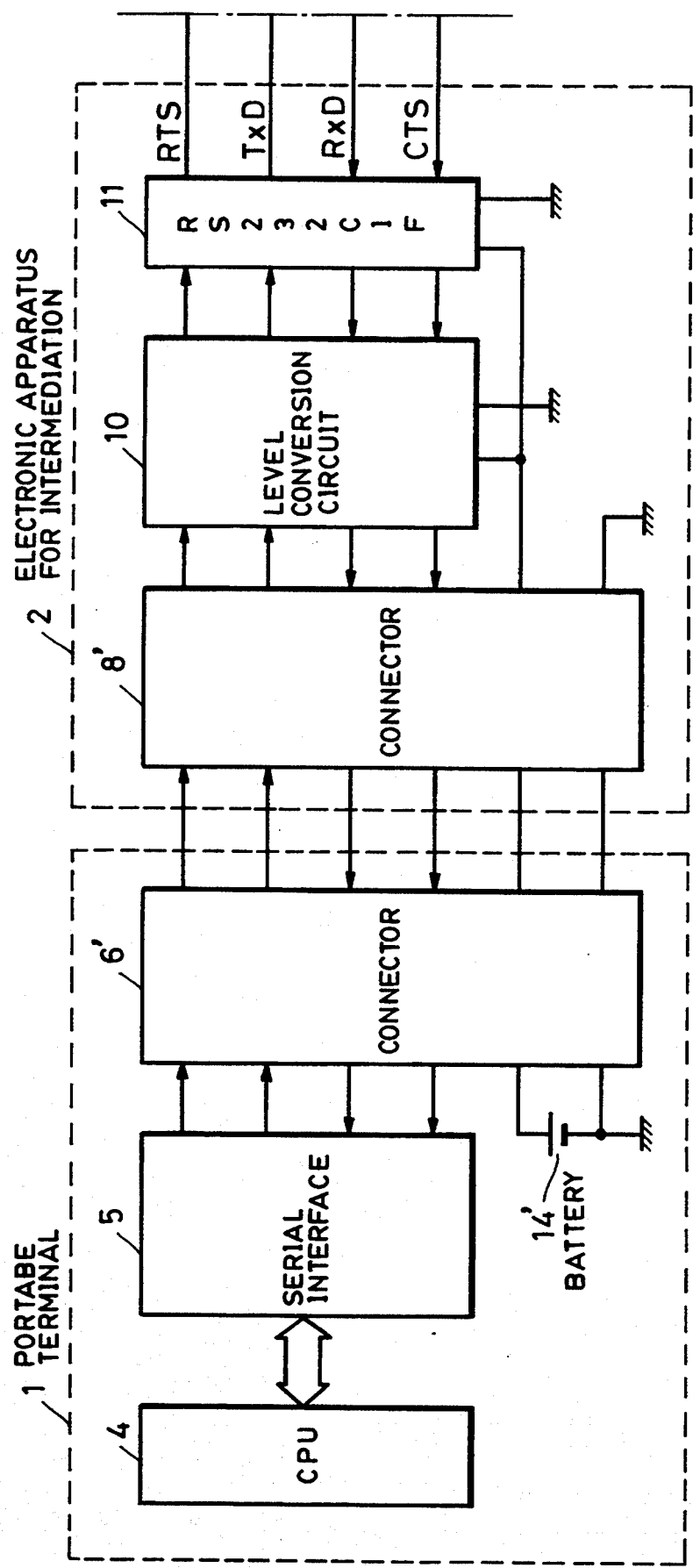

DATA COMMUNICATION METHOD AND APPARATUS HAVING IMPROVED CONTROL OVER A DETACHABLE TERMINAL DEVICE

This application is a continuation of application Ser. No. 07/372,906, filed Jun. 29, 1989, now abandoned.

BACKGROUND OF THE INVENTION

1. Field of the Invention

This invention relates to a data communication system, and more particularly, to a data communication system for performing data communication between a host computer and a portable terminal.

2. Description of the Related Art

In a data communication system for performing data communication between a host computer and a portable terminal, it is common to provide an electronic apparatus for intermediation which is connected to the host computer and which can be connected to the portable terminal, and when starting communication between the host computer and the portable terminal, the procedure is to turn on a power supply switch of the electronic apparatus for intermediation, connect the portable terminal to the electronic apparatus for intermediation, and perform an instruction for starting communication from the portable terminal to the host computer by a key input on the portable terminal. After a communication state has been thus established, communication has been performed and communication has been completed, the connection of the portable terminal is disconnected, and the power switch is then turned off to terminate a series of operations for communication. In the above-described configuration, however, the power supply switch of the electronic apparatus for intermediation must be turned on and off at starting and terminating communication. This is a troublesome operation. If the power supply of the electronic apparatus is always kept turned on in order to avoid the troublesome operation, electric power is wasted. Alternatively, it often occurs that the operator forgets to turn off the power supply switch after terminating communication, and electric power is wasted also in this case.

Moreover, since it is necessary to perform a key input for instructing the start of communication from the portable terminal connected to the electronic apparatus, it becomes impossible to perform communication if the user does not understand the instructing operation for starting or has forgotten it. Particularly in an interactive system in which various operations are instructed for the user, once communication has been started the subsequent operations can be executed according to instructions from the host computer. The operation for starting communication, however, must be performed by the user himself without aid of the host computer.

If the electronic apparatus for intermediation is always kept in a communicating state in order to avoid the above-described problems, the number of electronic apparatuses for intermediation which can communicate with the host computer is remarkably limited.

SUMMARY OF THE INVENTION

It is an object of the present invention to provide a data communication system in ! which an electronic apparatus for intermediation is supplied with power only when communication is performed, without requiring a particular troublesome operation.

It is a further object of the present invention to provide a data communication system in which, when it is intended to start communication, an electronic apparatus for intermediation is turned on without requiring a particular troublesome operation.

It is a still further object of the present invention to provide a data communication system in which, when it is intended to terminate communication, an electronic apparatus for intermediation is turned off without requiring a particular troublesome operation.

It is still another object of the present invention to provide a data communication system in which, when it is intended to start communication, "start of communication" is instructed to a host apparatus from a terminal apparatus without requiring a particular troublesome operation.

It is still a further object of the present invention to provide a data communication system assumes a communicating state only when performing communication, without requiring a particular troublesome operation.

According to one aspect, the present invention which achieves these objectives relates to a data communication system comprising an electronic apparatus connected to a host apparatus, a terminal device which can be removably connected to the electronic apparatus, detection means for detecting that the terminal device is connected to the electronic apparatus, and control means for controlling so that transmission and reception of data are started between the host apparatus and the terminal device when the detection means has detected that the terminal device is connected to the electronic apparatus.

According to another aspect, the present invention relates to an electronic apparatus which is connected to a host apparatus and which can be removably connected to a terminal device, the electronic apparatus comprising power supply means for supplying electric power to the electronic apparatus and a switch connected to the power supply means for making said power supply means supply power to the electronic apparatus only while the terminal device is connected.

According to another :aspect, the present invention relates to an electronic apparatus which is connected to a host apparatus and which can be removably connected to a terminal device, the electronic apparatus comprising power supply means for supplying electric power to the electronic apparatus and a switch connected to the power supply means for stopping supply of the electric power to the electronic apparatus when the terminal device is disconnected from the electronic apparatus.

DESCRIPTION OF THE PREFERRED EMBODIMENTS

Figure 1B:
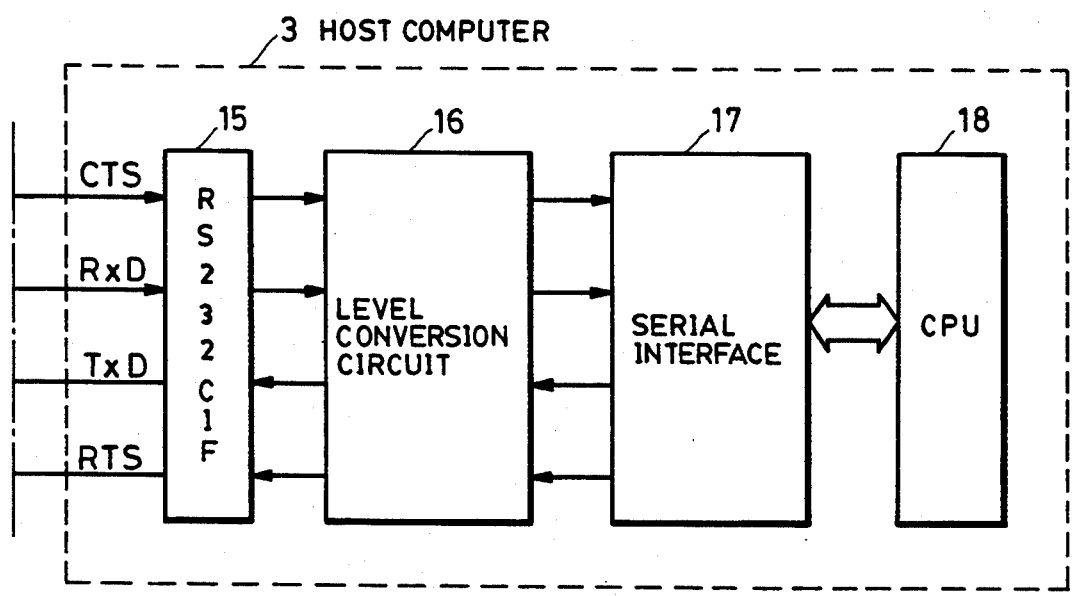
FIG. 1, composed of FIGS. 1A and 1B, is a block diagram of a first embodiment of a data communication system of the present invention.

FIG. 1 is a block diagram showing a first embodiment of the present invention. In FIG. 1A, a portable terminal 1 is removably connected to an electronic apparatus 2 for intermediation. The electronic apparatus 2 for intermediation is connected to a host computer 3 (FIG.

1B), and the portable terminal 1 performs transmission and reception of information with the host computer 3 via the electronic apparatus 2 for intermediation. In the portable terminal 1, a central processing unit (CPU) 4 includes a read-only memory (ROM) in which are stored a procedure for detecting the connection between the portable terminal 1 and the electronic apparatus 2 for intermediation and a procedure for controlling start of communication, which will be described later. The CPU 4 executes operations in accordance with these and other procedures. A serial interface 5 converts data into serial data. A light-emitting circuit 6 converts an output of the interface 5 into light and outputs the light. A photosensing circuit 7 receives a light signal sent from the electronic apparatus 2 for intermediation and converts it into an electric signal. In the electronic apparatus 2 for intermediation, a photosensing circuit 8 receives a light signal sent from the light-emitting circuit 6 and converts it into an electric signal. A light-emitting circuit 9 converts an electric signal into a light signal and transmits it to the photosensing circuit 7. A level conversion circuit 10 performs a mutual transformation between the levels, for example, TTL levels, of the photosensing circuit 8 and the light-emitting circuit 9 and RS232C levels. An RS232C interface 11 is connected to the level conversion circuit 10. A power supply switch 12 is provided at a portion where the portable terminal 1 is set, and is, in this embodiment, a push-type switch which is turned on by applying a pressure and turned off when the pressure is released. In the present embodiment, when the portable terminal 1 is mounted on an upper portion of the electronics apparatus 2 for intermediation, the power supply switch 12 is pressed due to the weight of the portable terminal. There are also shown an AC plug socket 13 for supplying power and a power supply circuit 14.

In the host computer 3, there is shown a central processing unit (CPU) 18 of the host computer. An RS232C interface 15 is connected the RS232C interface 11 of the electronic apparatus 2 for intermediation. A level conversion circuit 16 converts a signal of the interface 15 into a signal at a TTL level. A serial interface 17 is connected to the level conversion circuit 16 and performs communication of data with the CPU 18.

Next, the operation of the data communication system of the present embodiment having the above-described configuration will be explained.

Starting communication, when the portable terminal 1 is set at a predetermined position of the electronic apparatus 2 for intermediation, the push type power supply switch 12 is depressed by the portable terminal 1 and turned on. The electronic apparatus 2 for intermediation is thereby turned on and assumes a stable state. In the stable state, an RTS signal output from the RS232C interface 15 of the host computer 3 is sent to the CPU 4 or,the portable terminal 1 via the RS232C interface 11, the level conversion circuit 10, the light-emitting circuit 9 of the electronic apparatus 2 for intermediation, and the photosensing circuit 7 and the serial interface 5 of the portable terminal 1.

At the CPU 4, it is confirmed that the RTS signal sent from the host computer side has been normally received, and it is detected that, the portable terminal 1 has been set to the electronic apparatus 2 for intermediation. Subsequently, transmission and reception of data is started by turning on the RS signal in the portable terminal 1 and sending it to the host computer 3. As described above, simply by setting the portable terminal 1 to the electronic apparatus 2 for intermediation, the power supply of the electronic apparatus 2 for intermediation is turned on, and transmission and reception of data are then started.

For terminating communication, the pressure applied on the power supply switch 12 is released by removing the portable terminal 1 from the electronic apparatus 2 for intermediation, and the power supply is thereby turned off.

In the above-described embodiment, since an optical interface is used, it is unnecessary to use connectors for data communication between the portable terminal 1 and the electronic apparatus 2 for intermediation.

Furthermore, since an optical interface is adopted and it is arranged so that the power supply switch 12 is operated by the weight of the portable terminal 1, it is only necessary to put the portable terminal 1 on a predetermined upper portion of the electronic apparatus 2 for intermediation in order to connect the portable terminal 1 to the electronic apparatus 2 for intermediation. Hence, connection can be simply performed without requiring a great force.

Figure 2B:
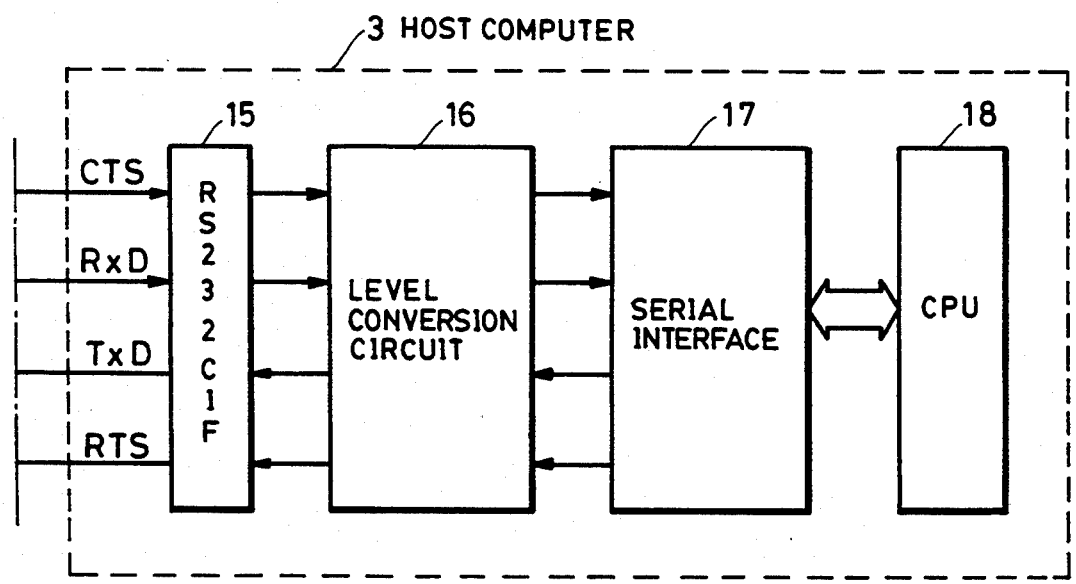
FIG. 2, composed of FIGS. 2A and 2B, is a block diagram of a second embodiment of a data communication system of the present invention.

FIG. 2 is a block diagram showing a second embodiment of the present invention. In FIG. 2, there is a difference from the first embodiment in that the interface between the portable terminal 1 and the electronic apparatus 2 for intermediation is performed not by light, but by using connectors having mechanical contacts, and a battery 14' of the portable terminal 1 is used as a power supply of the electronic apparatus 2 for intermediation. Accordingly, the light-emitting circuit 6 and the photosensing circuit 7 in the first embodiment are replaced by a connector 6' in the second embodiment, and the photosensing circuit 8 and the light-emitting circuit 9 in the first embodiment are replaced by a connector 8' in the second embodiment. Furthermore, the power supply switch 12, the AC plug socket 13 and the power supply circuit 14 in the first embodiment become unnecessary, and the battery 14' is used instead.

The operation in the second embodiment is as follows. First, by connecting the connector 6' of the portable terminal 1 and the connector 8' of the electronic apparatus 2 for intermediation to each other, electric power is supplied from the battery 14' of the portable terminal 1 to the electronic apparatus 2 for intermediation, and a stable state is obtained. In the stable state, an RTS signal output from the RS232C interface 15 of the host computer 3 is sent to the CPU 4 of the portable terminal 1 via the RS232C interface 11, the level conversion circuit 10 and the connector 8' of the electronic apparatus 2 for intermediation, and the connector 6' and the serial interface 5 of the portable terminal 1.

At the CPU 4, it is confirmed that the RTS signal sent from the host computer side has been normally received, and it is detected that the portable terminal 1 has been set to the electronic apparatus 2 For intermediation. Subsequently, transmission and reception of data are started by turning on the RTS signal in the portable terminal 1 and sending it to the host computer 3.

As described above, simply by setting the portable terminal 1 to the electronic apparatus 2 for intermediation, the power supply is supplied to the electronic apparatus 2 for intermediation, and transmission and reception of data are then started.

For terminating communication, supply of power from the battery 14' of the portable terminal 1 to the electronic apparatus 2 for intermediation is stopped by removing the portable terminal 1 from the electronic apparatus 2 for intermediation.

According to the above-described second embodiment, a power supply circuit and a power supply switch become unnecessary in the electronic apparatus 2 for intermediation.

Furthermore, when there are provided connectors as in the above-described second embodiment, means for power supply may be provided at the side of the electronic apparatus 2 for intermediation as in the first embodiment, a terminal connected to the power supply circuit may be provided at the connector unit, and a circuit may be closed by the connection of the connector to supply the power.

As explained above, according to the present invention, by mounting a portable terminal to an electronic apparatus for intermediation, power is supplied to the electronic apparatus for intermediation, and by removing the portable terminal, supply of the power Supply to the electronic apparatus for intermediation is stopped. Hence, the user need not turn on and off a power supply switch. Furthermore, since electric power is supplied only when data communication is performed, electric power is not wasted, and it is possible to prevent forgetting to turn off the power switch and the like. In addition, data communication can be started simply by mounting the portable terminal on the electronic apparatus for intermediation.

What is claimed is:

1. An electronic apparatus comprising:
   optical communication means mounted on an upper surface of the electronic apparatus for emitting and receiving a light signal;
   power supplying means for supplying power to the electronic apparatus; and
   switch means provided on said upper surface on which said optical communication means is mounted, for switching on said power supplying means to start a supply of power, said switch means switching on said power supplying means in response to a weight of a terminal device when the terminal device is put on said upper surface in order to optically connect said optical communication means with a light emitter/receiver of the terminal device.

2. An electronic apparatus according to claim 1, wherein said switching means switches off said power supplying means to terminate the supply of power when the terminal device is removed from said upper surface 3. An electronic apparatus according to claim 1, further comprising:
   conversion means connected to said optical communication means for converting an electronic signal into a light signal; and
   electronic communication means connected to said conversion means for communication with a host apparatus by an electronic signal.

* * * * *